United States Patent [19]

Nestler et al.

[11] 4,321,401

[45] Mar. 23, 1982

[54] PROCESS FOR THE MANUFACTURE OF PARTIAL HYDROLYSATES OF TETRA-(2-ALKOXYETHYL) SILICATES

[75] Inventors: Heinz Nestler, Troisdorf; Friedhelm Schnippering, Siegburg, both of Fed. Rep. of Germany

[73] Assignee: Dynamit Nobel Aktiengesellschaft, Postfach, Fed. Rep. of Germany

[21] Appl. No.: 180,782

[22] Filed: Aug. 25, 1980

Related U.S. Application Data

[63] Continuation of Ser. No. 13,647, Feb. 21, 1979, abandoned.

[30] Foreign Application Priority Data

Mar. 8, 1978 [DE] Fed. Rep. of Germany ....... 2809871

[51] Int. Cl.$^3$ .............................. C07F 7/08; C07F 7/18
[52] U.S. Cl. .................................. 556/457; 556/458; 556/459
[58] Field of Search .................. 556/457, 458, 459

[56] References Cited

U.S. PATENT DOCUMENTS

| | | | |
|---|---|---|---|
| 2,317,891 | 4/1943 | Dennison | 556/458 UX |
| 2,917,467 | 12/1959 | Olson et al. | 556/457 UX |
| 3,320,297 | 5/1967 | Pino | 556/458 |
| 3,364,246 | 1/1968 | Rossmy | 556/458 UX |

*Primary Examiner*—Paul F. Shaver
*Attorney, Agent, or Firm*—Sprung, Felfe, Horn, Lynch & Kramer

[57] ABSTRACT

A process for the preparation of partial hydrolyzates of orthosilicic acid tetra(alkoxyalkyl) ester having a stable shelf life is described by hydrolysis of a silicic acid tetra(alkoxyalkyl) ester with water, suitably in the presence of an acid and optionally in the presence of a solvent, wherein the stoichiometrically necessary amount of water is present at the commencement of the reaction.

13 Claims, No Drawings

PROCESS FOR THE MANUFACTURE OF PARTIAL HYDROLYSATES OF TETRA-(2-ALKOXYETHYL) SILICATES

This is a continuation of application Ser. No. 13,647, filed Feb. 21, 1979, now abandoned.

BACKGROUND OF THE INVENTION

1. Field of the Invention

This invention relates to the preparation of partial hydrolyzates of orthosilicic acid tetra(alkoxyalkyl) esters having stable shelf life. More especially, this invention relates to an improved process for the preparation of partial hydrolyzates of orthosilicic acid tetra(alkoxyalkyl) esters by hydrolysis of such orthosilicic acid tetra(alkoxyalkyl) esters with water wherein the stoichiometrically required amount of water is present at the commencement of the reaction.

2. Discussion of the Prior Art

The preparation of solutions of partial hydrolyzable silicic acid esters as well as their use as a binder for finely distributed compositions of matter is well known. Systems containing such hydrolyzates find use in the preparation of zinc powder coatings as well as in the technique of ceramic casting molds for precision casting or investment casting.

In most cases, the preparation of the partial hydrolyzates is derived from orthoethyl silicate or from polyethyl silicate, whereby both are easily obtained from silicon tetrachloride and ethanol. The silicates mentioned above can be produced by a simple process and, because of their relatively high content of $SiO_2$ and their reactivity toward water, possess advantages relating to commercial application. Their reactivity to water as well as dilute acid during separation of the easily detachable ethanol, whereby the partially hydrolyzable and condensed silicic acid ester and finally the $SiO_2$ capable of binding evolve, determines the commercial value of the product. By-product ethanol exhibits several drawbacks, such as its low flash-point and the low evaporation value, making these compositions in some areas of utilization unfit as binding agents. Because of these disadvantages, it became desirable to search for other starting silicates as silicic acid ester binders.

Besides the flash point and the volatility of the alcohols, the Si content of the compound, usually cited as $SiO_2$ content, plays a deciding role in the selection of suitable silicates. For use as a binder, the $SiO_2$ content of the composition should not be too low. The above-mentioned ethylsilicates, with their $SiO_2$ content of approximately 28 to 40 weight percent, show enough downward range for the hydrolysis reaction with water and the addition of suitable solvents.

When changing over to silicic acid esters of alcohols containing 4 carbon atoms and whose properties correspond to the above-mentioned requirements, as for example, ethoxyethanol, the $SiO_2$ content of these esters decreases to approximately 15 weight percent. If such an orthosilicic acid ester is hydrolyzed in the usual manner in the presence of corresponding solvents with equally higher flash-point, the $SiO_2$ content of the resulting hydrolyzate is additionally lowered in inadmissable manner. In addition, when the added mixture of dilute acid and solvent is too lean on solvent content, there results cloudy solutions from which a sediment gradually results. This occurrence seems to be caused by the fact that the gradually evolving hydrolysis products exhibit only low solubility in the unchanged starting ester and require a certain amount of solvent as a means for solubility, in this case especially ethoxyethanol.

In order to obtain a technically useful binding agent from ethoxyethyl silicate, the procedure of British Pat. No. 13 51 502 begins from a pre-condensed product with at least 19.1 percent $SiO_2$. The above is hydrolyzed with dilute hydrochloric acid in the presence of enough suitable solvent so that the partially hydrolyzed silicate does not settle out of solution.

Binding agents mentioned in German Offenlegungsschrift No. 21 47 865 are also based on polysilicates with at least 19 percent $SiO_2$. Such relatively high $SiO_2$ content in silicic acid ethoxy alkyl esters is obtained only with polysilicates rich in $SiO_2$ containing Si—O—Si— combinations in addition to the ester groupings attached to the Si atom. Usually, these polysilicates are hydrolyzable with dilute acid to the desired degree of hydrolysis in the presence of suitable solvents. The objective of the present invention consists in simplifying this complicated, multi-stage procedure for the preparation of a solution of partially hydrolyzed ethoxyethyl silicate.

SUMMARY OF THE INVENTION

In accordance with the present invention, the foregoing objects are provided by a process which provides clear to opaque hydrolyzates of orthosilicic acid tetra(alkoxyalkyl) esters, which process comprises hydrolyzing an orthosilicic acid tetra(alkoxyalkyl) ester with water wherein the entire amount of water necessary for the conversion of the orthosilicic acid tetra(alkoxyalkyl) ester to the desired degree of hydrolysis is present at the commencement of the reaction.

In accordance with the present invention, a simple process is provided whereby clear to opaque products comprising orthosilicic acid tetra(alkoxyalkyl) ester hydrolyzates are provided. The process eliminates the need for an intermediate condensation stage and minimizes the use of additional solvents. The process is characterized in that at the commencement of the process there is present in the reaction zone the entire amount of water required for the desired degree of hydrolysis. Generally speaking, to a reaction zone comprising the stoichiometrically required amount of water for the desired degree of hydrolysis there is added the orthosilicic acid tetra(alkoxyalkyl) ester to be hydrolyzed. This orthosilicic acid tetra (alkoxyalkyl) ester can be added in the form of a solution, i.e., in admixture with a solvent. Acid should preferably be present in the water prior to the time that the orthosilicic acid tetra(alkoxyalkyl) ester is added thereto. Additionally, acid can also be added to the water at the time the orthosilicic acid tetra(alkoxyalkyl) ester is added thereto, but from a separate source. In any event, the process is carried out by ensuring that the complete amount of water necessary for the hydrolysis is present at the commencement of the reaction.

In addition, it was found that one obtains a completely clear product without any use of an additional solvent when, in contrast to the usual procedure used for the preparation of a hydrolyzate, one places the amount of water or dilute acid necessary for obtaining the intended degree of hydrolysis and by admixing the silicate gradually. In this case also, the full amount of water is offered to the first portion of silicic acid ester. With immediate increase in temperature, the reaction proceeds to a totally clear product.

According to the inventive process, the silicic acid alkoxyalkyl ester is reacted with the amount of water of dilute acid, in some cases additionally containing a minor amount of solvent, which corresponds to the desired degree of hydrolysis in such a way that one offers immediately the amount of water necessary for the complete conversion to the ester.

During such spontaneous blending of both these liquids, sediments do not occur and a binding agent with an acceptable $SiO_2$ content is obtained.

Preferred solvents, in some cases added during the reaction, are those alcohols that correspond with the ester component of the silicic acid ester. Their presence is required only in amounts between 3 to 5 percent by weight, based on the total starting composition. There can be present any higher amount of solvent, based upon the weight of the starting composition, but this lowers the $SiO_2$ content of the binder in an undesired.

In the preferred working method, the conversion can be carried out without the addition of any solvent, where, in contrast to the usual procedure, the necessary amount of dilute acid is placed in a reaction vessel and the silicic acid ester is gradually admixed without interruption, whereby the reaction occurs under evolution of heat.

The degree of hydrolysis is chosen freely within limits adhering to the rule that with increasing degree of hydrolysis, that is with increasing amounts of water added, the reactivity of the formed hydrolyzate increases with respect to its binding qualities, while its shelf life decreases. Hydrolysis degree of over 100 percent make litte sense for the shelf life of the product, just as binding agents with hydrolysis degrees of under 40 percent make no sense for practical use because of their substantially inert reaction to particles to be bound together. A hydrolysis degree within the range of 45 to 95 percent, especially 55 to 90 percent, is brachcally feasible. This means that, statistically, 45 to 95 percent, preferably 55 to 90 percent of the ester groups present in the silicic ester are hydrolyzed.

In order to obtain such a degree of hydrolysis, one must admix amounts of water ranging from 4 to 8.5 weight percent, preferably from approximately 5 to 8.2 weight percent, based on the total starting composition.

The reaction is acid-catalyzed. Mostly inorganic acids, such as hydrochloric acid, sulfuric acid or phosphoric acid are used, of which hydrochloric acid is preferred. The amount of the admixed acid is, in itself, not critical. However, it must be sufficient to activate the hydrolysis reaction immediately when mixing the components, which becomes noticeable by means of immediate temperature increase. In addition, the amount of acid should not be too large, in order not to lead to difficulties or damage to the end product after letting the reaction of the binder run to completion, i.e., with zinc powder in anti corrosive coating or with ceramic powder in casting molds. In a practical manner, instead of using the above-mentioned amounts of water, dilute acids with acid concentration of 0.5 to 5 weight percent, especially 1 to 3 weight percent, are admixed. In the case of hydrochloric acid, the acid contents correspond to 0.02 to 0.4 percent HCl, based on the total starting composition.

After the start of the conversion, the temperature increases rapidly from the 20° C. starting temperatures of the components to approximately 50° C. and remains at this level until it decreases gradually toward the end of the reaction.

The described procedure lends itself especially for the partial hydrolysis of such silicic acid esters, the hydrolysis of which cannot be performed in accordance with the usual procedure where water is added continuously to the silicic acid ester, because thereby undesired sediments are formed. It is also used in special cases when such silicic acid esters should be partially hydrolyzed, already possessing a relatively low $SiO_2$ content, e.g., between 11 and 19 percent, whereby with the use of additional solvents, the total $SiO_2$ content of the resultant binding agent would be reduced to values which do not guarantee a reasonable hardening because of $SiO_2$ evolution during the hardening process. According to the inventive process, those silicic acid esters which are especially hydrolyzable are those characterized by the formulae $Si(OR'OR)_4$ where R is an alkyl group and R' is an alkylene group, each of these groups can contain 1 to 4 C-Atoms, e.g., $Si(OC_2H_4OR)_4$.

The partial hydrolyzates obtained in accordance with the inventive process exhibit remarkably long shelf life, i.e., amounting to more than 4 months for a hydrolysis degree of 75 percent at 70° C. The flash point of these preparations amounts to at least 44° C.

The partial hydrolyzates produced in accordance with the invention are widely used as binding agent, especially where a silicic binding of finely distributed solid matter is desired. When using it as a binding agent for zinc powder paints, the flash point and the especially long setting time of the prepared color are noteworthy, lasting more than 3 months for a hydrolysis degree of 65 to 70 percent of the binding agent. It is also useful as a binder for ceramic casting molds where it is without any problems and provides stable-dimensioned, true surface forms, suitable for the casting of metals and alloys, including steel.

In order to more fully illustrate the nature of the invention and the manner of practicing the same, the following examples are presented:

EXAMPLES

EXAMPLE 1

6 parts by weight of 2 percent hydrochloric acid are placed in a reaction vessel and 94 parts by weight of tetra-(2-ethoxyethyl)-silicate are admixed under constant agitation. Caused by spontaneous reaction, the temperature rose within the first minute to over 40° C., whereby the mixture turned fully clear. The maximum temperature was reached after approximately 50 minutes, namely, before the total amount of ethoxyethyl silicate had been admixed. The hydrolysis degree of the obtained binding agent amounted to approximately 67 percent, the $SiO_2$ content was approximately 14.5 percent. The flash point was around 44° C. After a shelf life of 4 months at 70° C., neither sediments nor gel formations appeared.

EXAMPLE 2

In similar manner as described in Example 1, further binding agents were produced with the following compositions:

| | $SiO_2$ content | Hydrolysis degree |
|---|---|---|
| (a) 5 parts by weight of 2 percent hydrochloric acid, 95 parts by weight of tetra-(2-ethoxyethyl) silicate | 14.6% | 55% |

-continued

|   | | SiO₂ content | Hydrolysis degree |
|---|---|---|---|
| (b) | 8 parts by weight of 2 percent hydrochloric acid, 92 parts by weight of tetra-(2-ethoxyethyl) silicate | 14.2% | 91% |
| (c) | 6 parts by weight of 1 percent hydrochloric acid, 94 parts by weight of tetra-(2-ethoxyethyl) silicate | 14.5% | 67% |
| (d) | like (c) but with 3 percent hydrochloric acid | 14.5% | 67% |

All binding agents showed temperature movements as described in Example 1. Clear, stable produces evolved with shelf lives of at least 2 months at 70° C.

EXAMPLE 3 (Comparative Example)

In a vessel equipped with agitator, 89 parts by weight of tetra-(2-ethoxyethyl)-silicate are placed, and within 12 minutes, a mixture of 6 parts by weight of 3 percent hydrochloric acid and 5 parts by weight of ethoxyethanol is added to it. The mixture is stirred constantly. After completion of the addition, the temperature rises gradually to 43° C., and after an additional 8 minutes to 45° C. The end product is cloudy, sediment appears after settling for a day. The mixture is unfit for use as a binding agent.

EXAMPLE 4

In the reaction-vessel described in Example 3, 89 parts by weight of tetra-(2-ethoxyethyl)-silicate are placed, and a mixture of 6 parts by weight of 3 percent hydrochloric acid and 5 parts by weight of ethoxyethanol is added under agitation in one pouring. Within 1½ minutes, the temperature rises to 42° C. and gradually decreases again. The evolved product is clear and stable for storage. Its degree of hydrolysis amounts to 69 percent.

EXAMPLE 5 (Use in a Paint Composition)

In accordance with Example 1, 10 parts by weight of a binding agent were mixed with 43 parts by weight of zinc powder of the type Lindur S 75 MM to form a paint. This paint was applied to a sand-blasted steel plate and supplied a solid adhesive and sufficiently hard coating so that it exhibited the pencil hardness H after 6 hours. As is usually done, anti-settling agents (i.e., bentone and highly dispersible silicic acids) can be added to such a paint system. Such zinc powder coatings supply a high grade corrosion protective coating.

EXAMPLE 6 (Slip Formulation for Investment Casting Molds)

In a paste mixture consisting of 170 parts by weight of binding agent corresponding to Example 2d and 600 parts by weight of zirconium silicate powder, wax models are submersed in known fashion and sprinkled with fine grained refractory products in a fluidized bed thereafter. Such a coating is first of all dried in air and later hardened in a chamber filled with ammonia gas. Before other coatings are applied in similar fashion, the coating below must be aired sufficiently in order to remove ammonia residue. From such a mold, consisting of approximately 5 to 8 layers, the wax is liquified and the ceramic is fired at 1000° C. After the firing, these molds can be cast.

EXAMPLE 7 (Slip Formulation for Precision Casting Molds)

120 parts by weight melting mullite, 0–0.04 mm;
40 parts by weight melting mullite, 0.12–0.25 mm;
40 parts by weight melting mullite, 0.25–0.5 mm;
are mixed with 57 parts by weight of binding agent according to Example 2c. After addition of 4 parts by weight of 10 percent ammonium carbonate solution and intensive agitation, a slip mixture evolves which hardens within a short period of time (approximately 7 minutes) after pouring it over a suitable pattern. After removal of the pattern, the mold can be torched and fired. Molds produced in this manner are suitable for the casting of steel.

What is claimed is:

1. A process for the preparation of a partial hydrolyzate of an orthosilicic acid tetra(alkoxyalkyl) ester having a stable shelf life by contacting an orthosilicic acid tetra(alkoxyalkyl) ester with water, the improvement which consists essentially of carrying out the hydrolysis such that the entire amount of water necessary for the desired degree of hydrolysis is present in the reaction zone at the commencement of the reaction, said entire amount of water being 4 to 8.5 weight percent water based upon the combined amount of orthosilicic acid tetra(alkoxyalkyl) ester and water.

2. A process according to claim 1 wherein the amount of water present in the reaction mixture at the commencement of the reaction corresponds to a degree of hydrolysis of 45 to 95 percent.

3. A process according to claim 1 wherein the water is acidulated with 0.5 to 5 percent by weight of an inorganic acid, based upon the weight of said water.

4. A process according to claim 1 wherein the process is carried out by initially introducing into the reaction zone the required amount of water necessary for the hydrolysis and thereafter introducing into the water non-hydrolyzed orthosilicic acid tetra(alkoxyalkyl) ester.

5. A process according to claim 1, wherein the orthosilicate acid tetra(alkoxyalkyl)ester is one having the formula $Si(OR'OR)_4$ where R is an alkyl group and R' is an alkylene group, each of these groups containing 1 to 4 carbon atoms.

6. A process according to claim 1, wherein hydrolysis is performed without the use of additional solvent.

7. A process according to claim 6, wherein hydrolysis is performed without the use of additional solvent.

8. A process according to claim 1, wherein there is present in the hydrolysis mixture a minor amount of additional solvent.

9. A process according to claim 6, wherein there is present in the hydrolysis mixture a minor amount of additional solvent.

10. A process according to claim 1, wherein there is present in the hydrolysis reaction mixture a solvent in an amount up to 5% by weight, based on the total starting composition.

11. A process according to claim 5, wherein there is present in the hydrolysis reaction mixture a solvent in an amount up to 5% by weight, based upon the total starting composition.

12. A process according to claim 10 wherein said solvent is ethoxyethanol.

13. A process according to claim 11, wherein said solvent is ethoxyethanol.

* * * * *

UNITED STATES PATENT AND TRADEMARK OFFICE
CERTIFICATE OF CORRECTION

PATENT NO. : 4,321,401

DATED : March 23, 1982

INVENTOR(S) : Heinz Nestler et al

It is certified that error appears in the above-identified patent and that said Letters Patent are hereby corrected as shown below:

Col. 6, line 48        Delete "6" and insert --5--.

Col. 6, line 53        Delete "6" and insert --5--.

Signed and Sealed this

Twenty-second Day of June 1982

[SEAL]

Attest:

Attesting Officer

GERALD J. MOSSINGHOFF

Commissioner of Patents and Trademarks